United States Patent [19]

Slater

[11] 4,177,760

[45] Dec. 11, 1979

[54] LIQUID FLOW SENSING DEVICE

[75] Inventor: Paul Slater, Palmerston North, New Zealand

[73] Assignee: Delta Plastics Limited, Palmerston North, New Zealand

[21] Appl. No.: 876,524

[22] Filed: Feb. 10, 1978

[30] Foreign Application Priority Data

Feb. 11, 1977 [NZ] New Zealand .................. 183315

[51] Int. Cl.² ............................................. A01J 7/00
[52] U.S. Cl. ................................................ 119/14.08
[58] Field of Search .... 119/14.08, 14.01, 14.13–14.17, 119/14.55, 14.1; 137/408

[56] References Cited

U.S. PATENT DOCUMENTS

| | | | |
|---|---|---|---|
| 3,556,053 | 1/1971 | Padman et al. | 119/14.08 |
| 3,957,018 | 5/1976 | Barrett | 119/14.08 |
| 3,986,482 | 10/1976 | Novak | 119/14.08 |

Primary Examiner—Hugh R. Chamblee

[57] ABSTRACT

A liquid flow sensing device which comprises a weight sensitive control means movable between first and second positions though biassed towards the first position. A first valve section is provided which is movable in response to movement of the control means while a second valve section is fixed in relation to the first section. First and second ports are provided with either of the first and second sections and a third valve section is located in a cooperating relationship with said first and second sections. The third valve section has means for providing communication between the first and second ports and is movable independently of the first and second sections so that the first and second ports are isolated when the control means is in said first position and moves to the second position. Means are provided for coupling said first and third valve sections whereby as the control means reverts to the first position the first and second ports are connected.

20 Claims, 3 Drawing Figures

LIQUID FLOW SENSING DEVICE

This invention relates to a liquid flow sensing device and more particularly concerns a sensing unit for use in milking machinery apparatus which automatically attends to removal of teat cup clusters from animals which have been milked or where the milk flow rate has reached a predetermined level.

Automatic teat cup cluster removal systems have been devised whereby the cluster is automatically removed when the end-point of milking has been reached. With increasing herd sizes being handled by herringbone and rotary platform type milking parlours the need for such systems has become very important in order that the herds can be handled by the minimum number of operators.

The cluster removal system normally incorporates some form of milk flow rate sensing unit and an example is disclosed in New Zealand Patent specification No. 175466 or the corresponding U.S. Pat. No. 3,957,018. Basically, the unit disclosed in the said specification comprises a pivotally mounted container which is biassed toward a first position. When milking commences milk flows into the container until the volume exceeds in weight the counterbalancing or bias weight. The container thus moves to a second position and remains there until the milk flow drops and the milk draining from the container exceeds the inflow and once more the counterbalance weight is greater and the container moves back to the first position. The unit is so constructed that on returning to the first position the milk line is closed so vacuum to the cluster is cut off.

To a certain extent this unit provides an effective flow sensing device but like other units has proved to be unreliable due to lack of compensation for a biassing force set up by the hoses forming the milk line. It has been found that with flow sensing units having a function of the general type whereby a container into which milk flow enters is balanced against a counterweight, movement of the working parts can be adversely affected by a biassing force set up by milk lines leading to or from the container or a combination of both or alternatively by the milk line being clamped to effect closure thereof. This is most noticeable when the point of balance between the reducing milk flow and the counterweight is reached and can lead to premature cluster release or over-milking.

Accordingly, it is an aim of the present invention to provide a liquid flow sensing device which is not biassed in operation by milk or other lines leading to or therefrom.

Broadly the invention consists of a liquid flow sensing device comprising a weight sensitive control means movable between first and second positions and biassed to said first position, a first valve section movable in response to movement of the control means, a second valve section fixed in relation to said first section, first and second ports provided with either of the first and second sections a third valve section located in a cooperating relationship with said first and second sections and having a means for providing communication between the first and second ports, said third valve section being movable independently of said first and second sections so the first and second ports are isolated when the control means is in said first position and moves to the second position and means for coupling said first and third valve sections whereby as the control means reverts to said first position the first and second ports are connected.

In more fully describing the invention reference will be made to the accompanying drawings in which.

Figure 1:
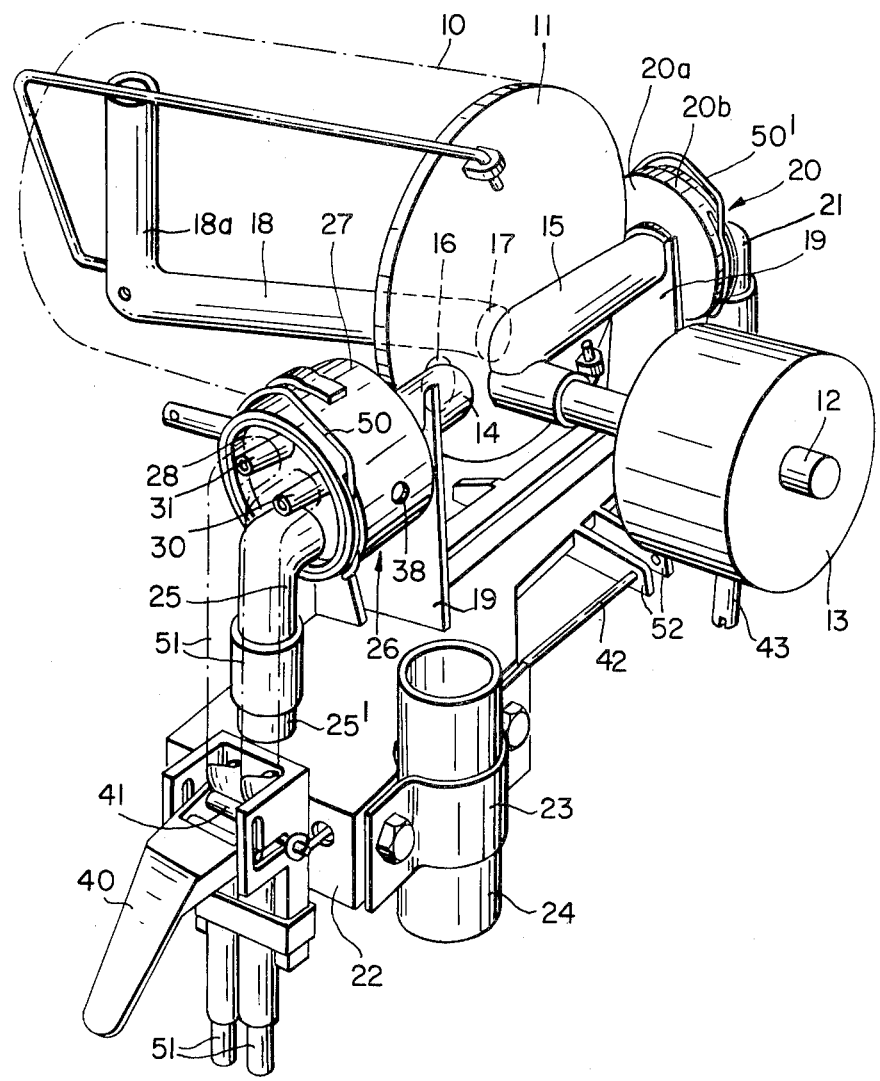
FIG. 1 is a perspective view of the device according to the invention.
Figure 2:
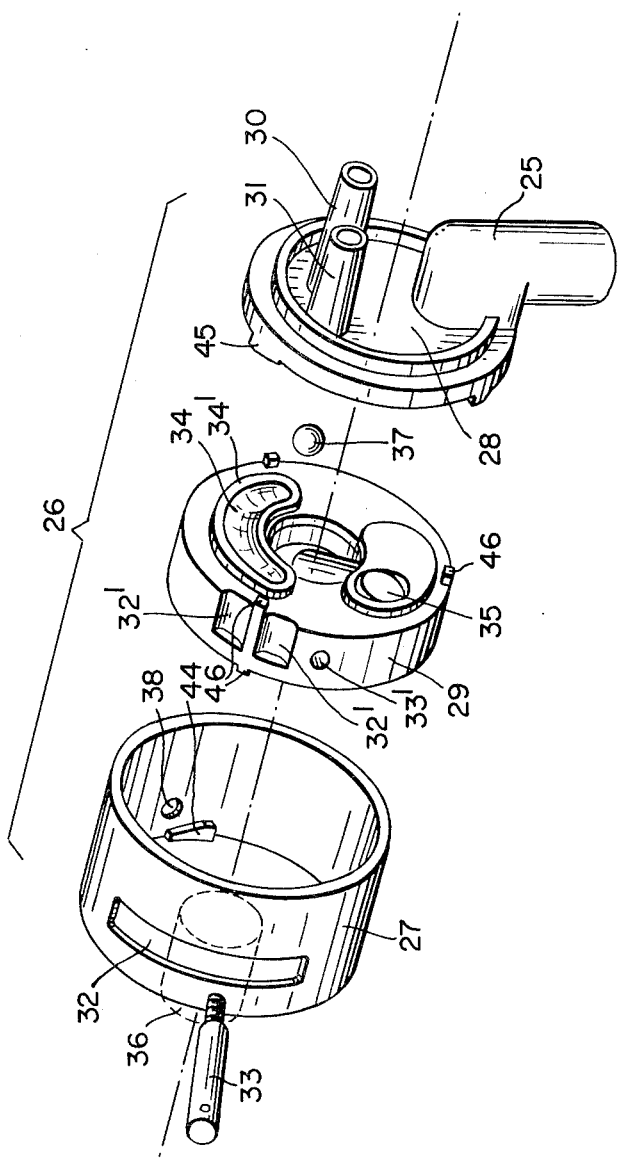
FIG. 2 is an exploded view of the three valve sections.

Referring to FIG. 1 the weight sensitive control means is a container 10 of glass, stainless steel or plastics material mounted on a manifold plate 11 which is provided with a projecting support 12 on which is located a weight 13. The manifold plate 11 incorporates manifolds 14 and 15 which respectively form inlet and outlet passages 16 and 17. Manifold plate 11, manifolds 14 and 15, valve section 27 and union 20 are preferably formed as an integral unit of plastics material. Outlet passage 17 is coupled to a pipe 18 which locates in container 10 and has an elbow portion 18a. A series of openings (not shown) are provided in elbow portion 18a. The manifolds 14 and 15 are rounded at their extremities to provide pivot axles which locate in bifurcated supports 19.

A union 20 couples outlet pipe 21 so that the outlet passage 17 opens into pipe 21 and thus pipe 21 forms, in the preferred use of the device, a milk line connected to a milk receiver and vacuum source. This line is fully open to the container and thus has no valve.

In the illustrated form union 20 is made up of a circular base 20a preferably formed as an integral part of manifold 15. A peripheral wall 20b extends from base 20a. Pipe 21 is attached to a disc (not shown) which fits snugly within the peripheral wall 20b. A retaining clip 50' engages through slots cut in wall 20b to retain the disc therein. A certain amount of axial float, i.e. movement of the disc, is allowed for cleaning purposes. During milking the disc sealingly engages against base 20a due to the milking vacuum. When washing takes place the disc disengages from base 20a so that all the internal surfaces of union 20 are cleansed.

The supports 19 form part of a mounting bracket 22 which is fixed by a suitable clamp 23 to a stanchion 24 which is part of the pipework in the milking shed into which the device is installed. An integral part of this bracket 22 is a conveniently positioned inlet pipe 25' which is coupled to the inlet stub pipe 25 of second valve section 28 of valve 26.

Valve 26 consists of a rotating housing or first section 27, a stationary plate or second section 28 and an intermediate plate or third section 29. The stationary plate 28 has two air ports A and B with stub pipes 30 and 31 extending from ports A and B. Port A is coupled to a cylinder (not shown) which forms part of the cluster removal device and port B is coupled by a line to a vacuum source. The cavity formed between the second 28 and third section 29 is coupled to atmosphere via a cut out 32' in the periphery of the third section and an aligning slot 32 in the periphery of the first section 27 which slots 32 and 32' constitute a venting system. The aforementioned cavity is formed due to groove 34 (to be hereinafter described) being part of a protruberance 34' from the face of section 29. Protruberance 34' engages on the inside surface of plate 28 thus keeping the surface away from the face of third section 29.

The housing 27 is preferably integral with the manifold plate 11 and thus rotates about the pivot axis of the container 10 in response to movement by the container.

In the periphery of this housing 27 is slot 32 which enables the intermediate plate 29 to be moved radially by a lever 33. Lever 33 has a screw threaded end which fits into threaded opening 33' in intermediate plate 29. The intermediate plate 29 has formed on the base thereof a concentric groove 34 which upon movement of the plate 29 can couple ports A and B together or isolate port B and expose port A to atmosphere via the venting system previously described. A port 35 is provided in plate 29 and this opens and closes, depending on the position of plate 29 in relation to the stationary plate 28, the inlet pipe 25 of second section 28 and passage 36 of housing 27.

It will be appreciated that valve 26 forms the actuating mechanism for a cluster remover and the counterbalanced container 10 is simply a means of activating the valve according to a prescribed sequence of events. The sequence is as follows, and in this it is assumed that milking is in progress and that the operator is about to put the teat cups onto the cow.

At this point in the sequence the container 10 is empty and therefore is in the raised position with the counterweight 12 lowermost. As will more clearly be described the set lever 33 will be in its intermediate position (see FIG. 3A) due to a spring loaded ball 37 in plate 29 locating in hole 38 in the periphery of housing 27. In such position the inlet pipe 25 is closed and ports A and B are coupled by the concentric groove 34 in plate 29. In the drawing the ports which are closed are shown shaded.

Figure 3:
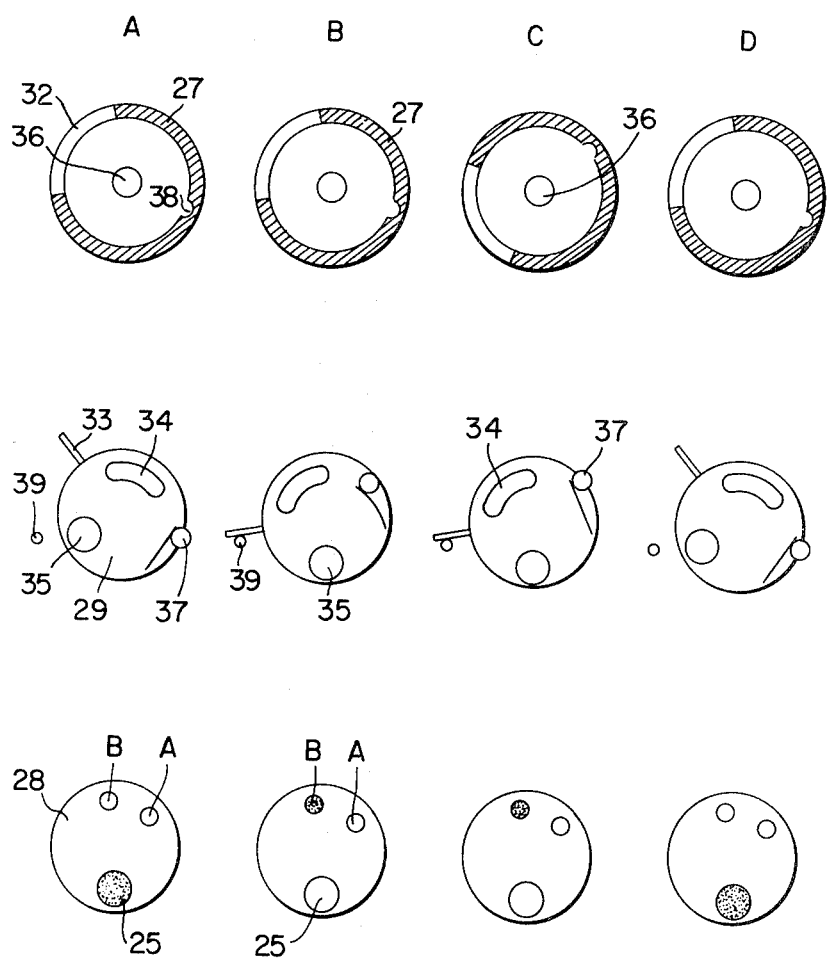
FIG. 3 shows four positions of the valve sections during operation of the device.

The operator takes the cluster in one hand and with the other rotates the set lever 33 to the lower position shown in FIG. 3B. In this position ball 37 is not engaged in opening 38. This opens port A to atmosphere through the vent system 32 and 32' previously described whilst orifice 25 is opened to connect the teat cup to the vacuum source. The cluster is now taken to the cow's udder and fitted in the normal manner. This movement of the cluster is possible as no vacuum is being applied to the removal cylinder due to port A venting to atmosphere.

When the cow starts to "let down" the container 10 fills and just prior to it being full it swings down thus rotating the housing 27 until its position is as shown in FIG. 3C. When the container reaches 40° below the horizontal the spring loaded ball 37 locates into hole 38 so coupling the housing 27 with the plate 29. The container 10 remains in this position throughout the remainder of milk "let down".

As the cow dries out the level of milk in the container 10 drops until it is approximately 2% full. The counterweight 13 then swings downward rotating the container 10, housing 27 and plate 29 so closing the orifice 25 and groove 34 couples port A to vacuum port B. Accordingly, vacuum is applied to the removal cylinder which lifts the cluster from the cow's udder and vacuum is disconnected from the line to the cluster. This final position is shown in FIG. 3D.

When the next cow enters the bail the same procedure commences with the set lever 33 being moved downward into the position shown in FIG. 3B and the cluster is then applied. A stop 39 is provided to locate the downward movement of the lever 33.

The invention thus provides a milk flow sensing device which is extremely compact and efficient and is not prone to being adversely affected by any bias set up in rubber milk lines. The vacuum applied through valve 26 holds the three components 27, 28 and 29 together during operation though a retainer 50 is provided in the periphery of housing 27 to retain therein plates 28 and 29. As previously mentioned similar retainer 50' holds the plate from which outlet pipe 21 depends in union 20.

As is to be expected hygiene must play a large part in the design of any invention to be used in conjunction with foodstuffs and the cluster remover incorporates features which enhance its performance in this respect. These features are:

(I) The air lines 51 coupled to ports A and B can be crimped by snap-clamp lever 40 thereby preventing cleaning liquid and residue from entering the vacuum source and removal cylinder.

(II) Coupled to the snap-clamp pin 41 is a locking rod 42 which lies in guide holes in the mounting bracket 22. The movement required by the snap-clamp pin 41 to crimp the air lines 51 is utilised to move the locking rod 42 forward and so engage behind an extended screw 43 in the base of the counter-weight 13. This effectively retains the counter-weight 13 in the lowermost position and prevents the container 10 from moving under the influence of the cleaning liquid surging through the system. It will be appreciated when referring to FIG. 1 that in such clamped position screw 43 is located between guides 52 which extend from base 22.

(III) On the rearmost inner periphery of housing 27 there are three equi-spaced cams 44. On the inner face periphery of the plate 28 there are three similar cams 45 placed in opposition to the cams in the housing 27. On the front and rear face periphery of the valve plate 29 there are three raised portions 46 which under normal milking procedure do not engage with the cams 44 and 45 but when the set lever 33 is moved into an uppermost or wash position the raised portions 46 engage between both sets of cams 44 and 45 so as to spread the housing 27, intermediate valve plate 29 and inlet plate 28 thus facilitating thorough and efficient cleaning of the valve faces.

Before washing it is then necessary to follow the simple procedure outlined below.

The snap-clamp lever 40 is moved to its lowermost position thus crimping the air line couplings and locking the containter 10 in the manner described. The set lever 33 is then raised to its uppermost position thus separating the valve plates 28 and 29 from each other and housing 27.

Accordingly, the device is extremely easy to maintain and is hygenic in operation without unnecessary dismantling of component parts.

What is claimed is:

1. A valve unit for a liquid flow sensing device of the type having a control means which is movable between first and second positions when the flow rate is respectively low and high but biassed to the said first position, said valve unit comprising:
   a fluid inlet;
   a fluid outlet;
   a first section movable in response to movement of said control means;
   a second section;
   a fluid flow passage connecting said inlet and outlet;
   first and second ports;
   a third section which is movable independently of said first and second sections and has means for disconnecting said flow passage from said inlet and outlet;
   means for connecting said first and second ports together; and means for coupling said third section to said first section such that as said control means moves from said second position to said first position it moves both the first and third sections relatively to said second section so that the flow passage is disconnected from said inlet and outlet and said first and second ports are connected by said port connecting means.

2. A valve as claimed in claim 1, wherein a third port is provided and is coupled to one of said first and second ports when said first and second ports are isolated, said third port being isolated from said one port when said first and second ports are connected by said port connecting means.

3. A valve as claimed in claim 2, wherein said second section is provided with the first and second ports and said fluid inlet, and said first section is provided with said fluid outlet.

4. A valve as claimed in claim 3, wherein said third port is situated in said first section and is coupled to said first or second port by means provided with said third section.

5. A valve as claimed in claim 4, wherein said third section is located in said first section and retained therein by said second section such that the third section is disposed between said fluid inlet and outlet.

6. A valve as claimed in claim 5, wherein said third section is substantially disc shaped and is located for rotational movement within a circular opening in said first section, said circular opening being closed by said second section, the third section being rotatable within the first section by external operating means.

7. A valve as claimed in claim 6, wherein the port connecting means is a groove formed in the surface of the third section which faces the surface of the second section through which the first and second ports open into said first section.

8. A valve as claimed in claim 7, wherein said groove is of curved shape and coaxial with the axis of rotation of the third section, the length of the groove being sufficient to span between said first and second ports.

9. A valve as claimed in claim 7, wherein said third port is located in the first section to be radially disposed to said third section, the third section having a duct means which opens to said third port when said groove has been moved beyond one of said first and second ports.

10. A valve as claimed in claim 9, wherein said coupling means comprises a member biassed to extend from the peripheral surface of the third section so as to engage in a seating in said first section.

11. A valve as claimed in claim 10, wherein said member is a spring loaded ball located in an opening in said peripheral surface.

12. A liquid flow sensing device comprising: control means which is movable between first and second positions when the flow rate is respectively low and high;
biassing means to bias said control means to said first position; and
a valve unit further comprising:
a fluid inlet;
a fluid outlet;
a first section coupled to said control means to be movable therewith;
a second section fixed in relation to said first section;
a fluid flow passage connecting said fluid inlet and fluid outlet;
first and second ports;
a third section which is movable independently of said first and second sections and has means for disconnecting said flow passage from said fluid inlet and fluid outlet;
means for connecting said first and second ports together; and
means for coupling said third section to said first section as said control means moves from said second position to said first position such that the flow passage is disconnected from said fluid inlet and fluid outlet and said first and second ports are connected by said port connecting means.

13. The device as claimed in claim 12, wherein said control means comprises a container mounted for rotation about a pivot axis so as to be movable between said first and second positions, said container having an inlet and outlet, the inlet being connected to the valve inlet by a passage coaxial with said pivot axis and the outlet leading into a passage also coaxial with said pivot axis, the first, second and third valve sections being rotatable relative to each other about an axis coaxial with said pivot axis.

14. The device as claimed in claim 13, further including a third port in the valve unit, said third port being coupled to one of said first and second ports when said first and second ports are not connected together and isolated from said one port when said first and second ports are connected by said port connecting means.

15. The device as claimed in claim 14, wherein said first and second ports and fluid inlet are provided in said second valve section, said fluid outlet and third port are provided in said first section, said third section is disposed between said inlet and outlet and said port connecting means are provided with said third section.

16. The device as claimed in claim 15, wherein said third section is of substantially a disc shape and is located for rotational movement within a circular housing in said first section, said circular housing being closed by said second section and operating means are coupled to said third section to extend through an opening in the housing to be accessible externally of said valve unit.

17. The device as claimed in claim 16, wherein the port connecting means is a groove formed in the surface of the third section which faces the surface of the second section through which the first and second ports open into said first section, said groove being of arcuate shape and coaxial with the axis of rotation of the third section, the length of the groove being sufficient to span between said first and second ports.

18. The device as claimed in claim 17, wherein said third port is located in said first section to be radially disposed to said third section, the third section having duct means communicating with one of said first and second ports and which opens to said third port when said groove has been moved beyond said one of said first and second ports.

19. The device as claimed in claim 13, wherein said first, second and third sections are movable axially away from each other, cam means being provided with said first, second and third sections whereby predetermined rotational movement of said third section cause said cam means to move said sections axially away from each other.

20. Apparatus for the removal of milking machine teat cups from an animal being milked comprising:
a liquid flow sensing device as claimed in claim 14;
a milk line coupling said valve inlet to teat-cup cluster;

a conduit coupling the container outlet to a milk receiver and vacuum source;
a conduit coupling one of said first and second ports to said vacuum source;
a conduit coupling the other of said first and second ports to a cluster removal cylinder; and
said third port vented to atmosphere.

* * * * *